(12) United States Patent
Hayashi et al.

(10) Patent No.: US 11,941,852 B2
(45) Date of Patent: Mar. 26, 2024

(54) THREE-DIMENSIONAL MEASUREMENT DEVICE, THREE-DIMENSIONAL MEASUREMENT METHOD, AND THREE-DIMENSIONAL MEASUREMENT PROGRAM

(71) Applicant: Kazusa DNA Research Institute, Kisarazu (JP)

(72) Inventors: Atsushi Hayashi, Kisarazu (JP); Nobuo Kochi, Kisarazu (JP); Takanari Tanabata, Kisarazu (JP); Sachiko Isobe, Kisarazu (JP)

(73) Assignee: Kazusa DNA Research Institute, Kisarazu (JP)

( * ) Notice: Subject to any disclaimer, the term of this patent is extended or adjusted under 35 U.S.C. 154(b) by 253 days.

(21) Appl. No.: 17/608,957

(22) PCT Filed: Feb. 25, 2020

(86) PCT No.: PCT/JP2020/007380
§ 371 (c)(1),
(2) Date: Nov. 4, 2021

(87) PCT Pub. No.: WO2020/240949
PCT Pub. Date: Dec. 3, 2020

(65) Prior Publication Data
US 2022/0215585 A1    Jul. 7, 2022

(30) Foreign Application Priority Data
May 31, 2019    (JP) .................................. 2019-102437

(51) Int. Cl.
*G06T 7/80*    (2017.01)
*G06T 7/00*    (2017.01)

(52) U.S. Cl.
CPC .................. *G06T 7/85* (2017.01); *G06T 7/97* (2017.01); *G06T 2207/10012* (2013.01); *G06T 2207/30208* (2013.01)

(58) Field of Classification Search
CPC . G03B 35/02; G06T 2207/10012; G06T 7/55; G06T 7/85; G06T 7/97; G01B 5/0035; H04N 2013/0081
See application file for complete search history.

(56) References Cited

U.S. PATENT DOCUMENTS

| 6,363,169 | B1 * | 3/2002 | Ritter ...................... G06T 17/10 382/154 |
| 9,207,069 | B2 | 12/2015 | Kitamura et al. |

(Continued)

FOREIGN PATENT DOCUMENTS

| JP | 2002094861 A | * | 3/2002 |
| JP | 2010-113398 A | | 5/2010 |

(Continued)

OTHER PUBLICATIONS

"Estimating 3D Leaf and Stem Shape of Nursery Paprika Plants by a Novel Multi-Camera Photography System"—Zhang et al., Graduate School of Agricultural and Life Sciences, The University of Tokyo. (Year: 2016).*

(Continued)

*Primary Examiner* — Mainul Hasan
(74) *Attorney, Agent, or Firm* — Oliff PLC

(57) ABSTRACT

A three-dimensional measurement device includes an image data receiving unit, a camera position selecting unit, a stereoscopic image selecting unit, and a camera position calculator. The image data receiving unit receives data of multiple photographic images. The photographic images are obtained by photographing a measurement target object and a random dot pattern from multiple surrounding viewpoints by use of a camera. The camera position selecting unit (Continued)

selects camera positions from among multiple positions of the camera. The stereoscopic image selecting unit selects the photographic images as stereoscopic images from among the photographic images that are taken from the camera positions selected by the camera position selecting unit. The camera position calculator calculates the camera position from which the stereoscopic images are taken. The selection of the camera positions is performed multiple times in such a manner that at least one different camera position is selected each time.

10 Claims, 9 Drawing Sheets

(56) References Cited

U.S. PATENT DOCUMENTS

| | | | |
|---|---|---|---|
| 9,977,983 B2 | 5/2018 | Kochi et al. | |
| 2010/0111364 A1 | 5/2010 | Iida et al. | |
| 2012/0256916 A1 | 10/2012 | Kitamura et al. | |
| 2015/0206023 A1 | 7/2015 | Kochi et al. | |
| 2020/0348385 A1* | 11/2020 | Schindler | G01S 17/46 |
| 2022/0101551 A1* | 3/2022 | Eberspach | G06T 5/002 |

FOREIGN PATENT DOCUMENTS

| | | | |
|---|---|---|---|
| JP | 2012122917 A | * | 6/2012 |
| JP | 2012-230594 A | | 11/2012 |
| JP | 2013-178656 A | | 9/2013 |
| JP | 2014-035702 A | | 2/2014 |
| JP | 2017-003537 A | | 1/2017 |
| JP | 2017003525 A | * | 1/2017 |
| JP | 2017026552 A | * | 2/2017 |
| JP | 2018-197685 A | | 12/2018 |
| WO | 2011/070927 A1 | | 6/2011 |

OTHER PUBLICATIONS

"Estimating 3D Leaf and Stem Shape of Nursery Paprika Plants by a Novel Multi-Camera Photography System"—Zhang et al., Graduate School of Agricultural and Life Sciences, The University of Tokyo, 2016. (Year: 2016).*

Jun. 2, 2020 International Search Report issued in International Patent Application No. PCT/JP2020/007380.

* cited by examiner

THREE-DIMENSIONAL MEASUREMENT DEVICE, THREE-DIMENSIONAL MEASUREMENT METHOD, AND THREE-DIMENSIONAL MEASUREMENT PROGRAM

TECHNICAL FIELD

The present invention relates to a technique for three-dimensional measurement using images.

BACKGROUND ART

Techniques for three-dimensionally understanding growth processes of plants are publicly known. The techniques obtain data relating to three-dimensional shapes of plants by using images. In one example, Patent Literature 1 discloses a technique for photographing a plant as a measurement target object while the plant is being turned and for generating a three-dimensional model of the photographed object (plant) based on the obtained multiple photographic images.

CITATION LIST

Patent Literature

Patent Literature 1: Japanese Unexamined Patent Application Laid-Open No. 2018-197685

SUMMARY OF INVENTION

Technical Problem

In three-dimensional measurement using images, it is necessary to perform matching (determination of correspondence relationships) between multiple images that are obtained from different viewpoints. FIG. 1A shows a case of photographing a measurement target object (in this case, a flower) placed on a turntable, by use of a camera, while the turntable is turned, to three-dimensionally measure the measurement target object. In this case, in terms of coordinates fixed relative to the turntable (measurement target object), the measurement target object is photographed from multiple surrounding positions. This technique determines each camera position by calculation using a method of resection and also calculates a three-dimensional position of each part of the measurement target object by a method of intersection.

Ideally, as shown in FIG. 1B, the camera position relative to the turntable has a distribution on the circumference of a circle. In actual cases, unfortunately, deviation occurs between a camera position (1) that is calculated first and a camera position (16) that is calculated last, as shown in FIG. 2. This is because calculation error gradually accumulates during the process of calculating the camera positions (1), (2), (3), (4), etc., in this order.

This deviation can be corrected by bundle adjustment calculation after the camera positions are calculated. However, the bundle adjustment calculation at a stage in which the error has already increased, as shown in FIG. 2, imposes a large load on a processor and may not converge.

In view of these circumstances, an object of the present invention is to provide a technique for suppressing reduction in calculation accuracy of a camera position in a technology of performing three-dimensional photogrammetry of a measurement target object by photographing the measurement target object from multiple surrounding viewpoints.

Solution to Problem

In one aspect of the present invention, a three-dimensional measurement device includes an image data receiving unit, a camera position selecting unit, a stereoscopic image selecting unit, and a camera position calculator. The image data receiving unit receives data of multiple photographic images. The photographic images are obtained by photographing a measurement target object and a random dot pattern from multiple surrounding viewpoints by use of a camera. The camera position selecting unit selects three or more camera positions surrounding the measurement target object from among multiple positions of the camera from which the multiple photographic images are taken. The stereoscopic image selecting unit selects the photographic images as stereoscopic images from among the photographic images that are taken from the camera positions selected by the camera position selecting unit. The camera position calculator calculates the camera position from which the stereoscopic images are taken, by a method of intersection and resection using the stereoscopic images. In this aspect, the selection of the camera positions is performed multiple times in such a manner that at least one different camera position is selected each time.

In one aspect of the present invention, a three-dimensional measurement device includes an image data receiving unit, a camera position selecting unit, a stereoscopic image selecting unit, and a camera position calculator. The image data receiving unit receives data of multiple photographic images. The photographic images are obtained by photographing a measurement target object and a random dot pattern from multiple surrounding viewpoints by use of a camera. The camera position selecting unit selects three or more camera positions surrounding the measurement target object, from among multiple positions of the camera from which the multiple photographic images are taken. The stereoscopic image selecting unit selects the photographic images as stereoscopic images from among the photographic images taken from the camera positions selected by the camera position selecting unit. The camera position calculator calculates the camera position from which the stereoscopic images are taken, by a method of intersection and resection using the stereoscopic images. In this aspect, the selection of the camera positions is performed multiple times in such a manner that different camera positions are selected each time.

In one aspect of the present invention, the camera position selecting unit may perform first selection of selecting N number of camera positions at angular positions mutually separated by 360 degrees/N (N is a natural number of 3 or greater) as viewed from the measurement target object. The camera position selecting unit may also perform second selection of selecting N number of camera positions at angular positions that are moved by 180 degrees/N, from the N number of the camera positions selected in the first selection, as viewed from the measurement target object.

In one aspect of the present invention, the random dot pattern may be formed on a surface of a longitudinal member that stands upward and is fixed on a table on which the measurement target object is placed. In this aspect, the longitudinal member preferably has a height greater than the height of the measurement target object placed on the table. In addition, in one aspect, the table may be turnable.

In one aspect of the present invention, the camera may photograph the measurement target object while the table is turned relative to the camera, whereby data of multiple photographic images of the measurement target object and the random dot pattern taken from multiple surrounding viewpoints are obtained. In this aspect, a turn center of the measurement target object may be positioned within a polygon that has apexes at three or more positions surrounding the measurement target object.

In one aspect of the present invention, a three-dimensional measurement method includes receiving data of multiple photographic images, the photographic images being obtained by photographing a measurement target object and a random dot pattern from multiple surrounding viewpoints by use of a camera. The method also includes selecting three or more camera positions surrounding the measurement target object, from among multiple positions of the camera from which the multiple photographic images are taken. The method also includes selecting the photographic images as stereoscopic images from among the photographic images taken from the selected camera positions, and calculating the camera position from which the stereoscopic images are taken, by a method of intersection and resection using the stereoscopic images. In this aspect, the selection of the camera positions is performed multiple times in such a manner that at least one different camera position is selected each time.

In one aspect of the present invention, a three-dimensional measurement program to be read by a computer, when executed by the computer, causes the computer to receive data of multiple photographic images, the photographic images being obtained by photographing a measurement target object and a random dot pattern from multiple surrounding viewpoints by use of a camera. The program also causes the computer to select three or more camera positions surrounding the measurement target object, from among multiple positions of the camera from which the multiple photographic images are taken. The program also causes the computer to select the photographic images as stereoscopic images from among the photographic images taken from the selected camera positions, and to calculate the camera position from which the stereoscopic images are taken, by a method of intersection and resection using the stereoscopic images. In this aspect, the selection of the camera positions is performed multiple times in such a manner that at least one different camera position is selected each time.

Advantageous Effects of Invention

The present invention provides a technique for suppressing reduction in calculation accuracy of a camera position in a technology of performing three-dimensional photogrammetry of a measurement target object by photographing the measurement target object from multiple surrounding viewpoints.

DESCRIPTION OF EMBODIMENTS

1. Principle

Figure 1A:
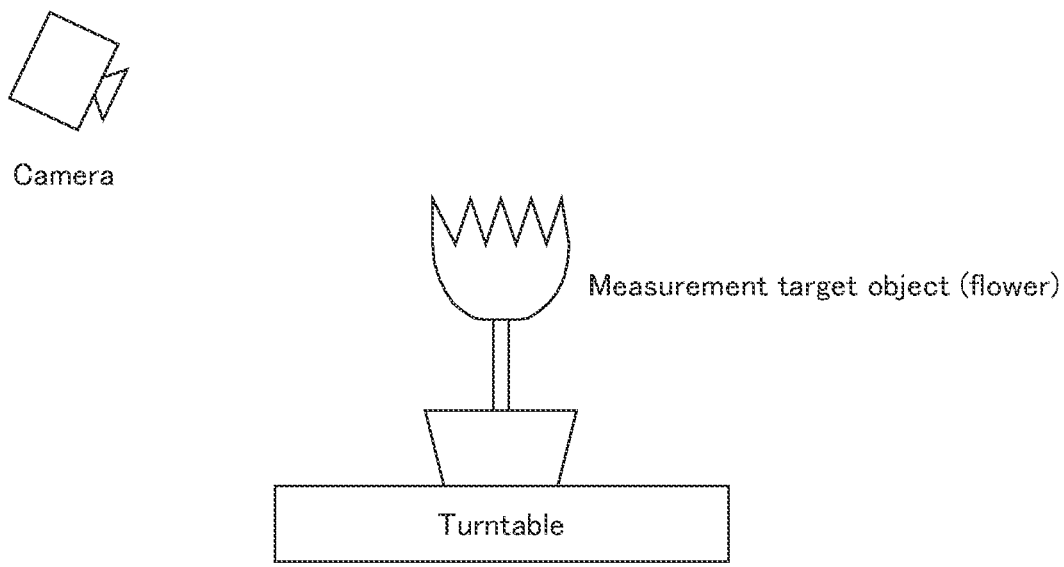
FIGS. 1A and 1B are principle diagrams for explaining a principle of three-dimensional measurement.
Figure 1B:
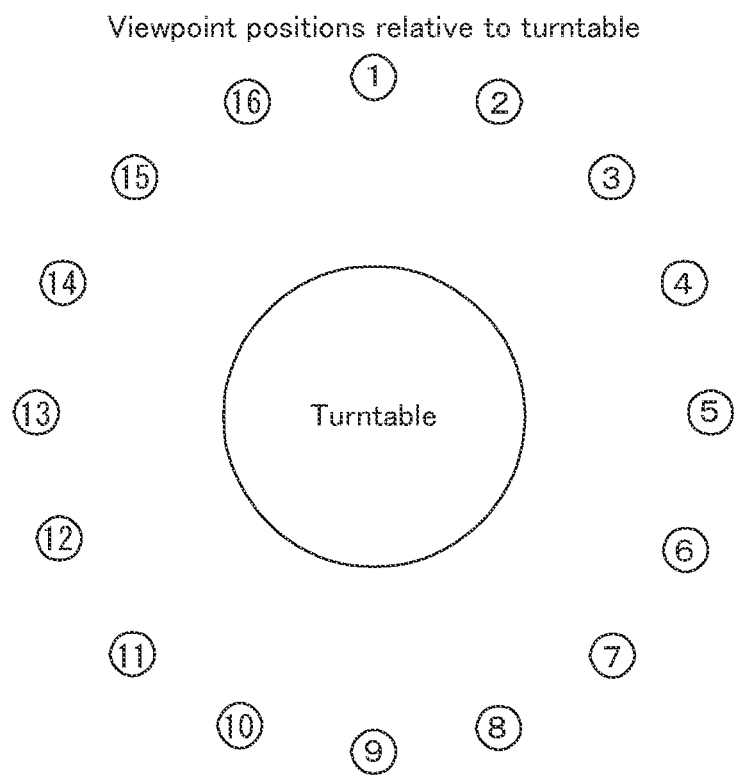

FIGS. 1A and 1B show a basic principle of the present invention. FIG. 1A shows a case of three-dimensionally measuring a measurement target object based on a principle of stereo photogrammetry. In this case, the measurement target object (in this case, a flower) is photographed by a fixed camera while a turntable is turned relative to the camera. Herein, in terms of a coordinate system fixed relative to the turntable, the camera position (viewpoint position) relative to the turntable has a distribution on the circumference of a circle centering on a turn center of the turntable, as shown in FIG. 1B. Note that FIG. 1B describes the turntable as seen downwardly from a direction along a turn axis of the turntable. The same applies to FIGS. 2 to 6.

Figure 2:
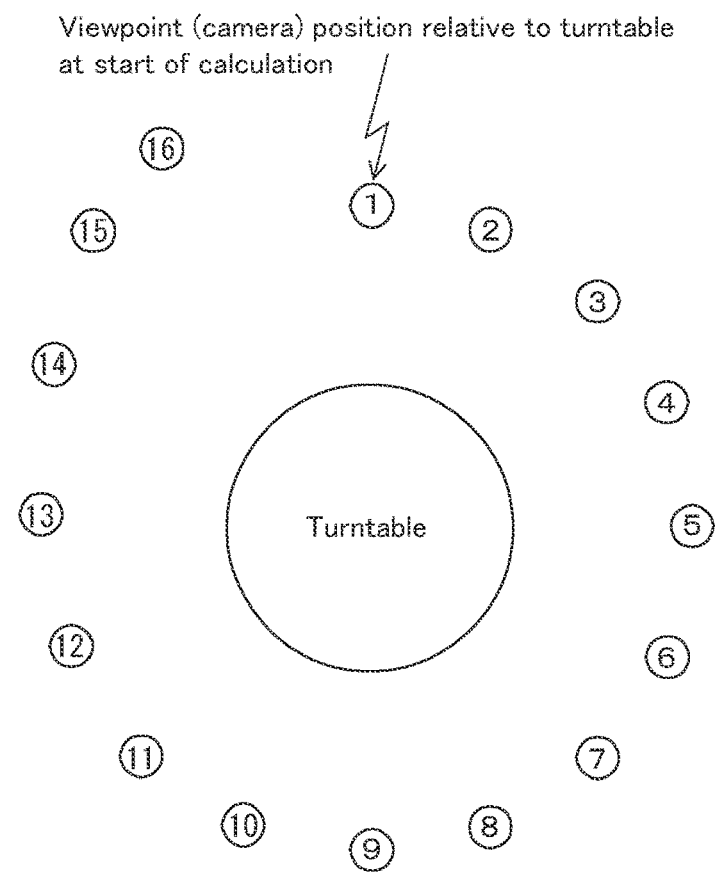
FIG. 2 is a principle diagram for explaining a principle of occurrence of error.

If the camera positions (1), (2), (3), etc., are consecutively calculated by using a method of intersection and resection, as the calculation is repeated, error accumulates, and the calculated camera position deviates from its actual position, as shown in FIG. 2.

Figure 3:
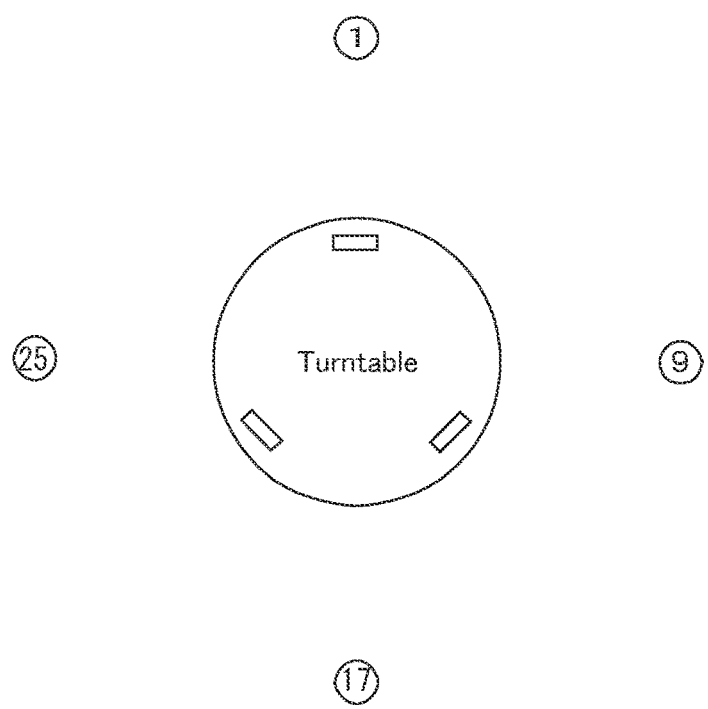
FIG. 3 is a principle diagram of an example of the invention.

In order to avoid this accumulation of deviation, the present invention employs a method shown as an example in FIG. 3. This method uses, for example, four photographic images that are taken from four positions (1), (9), (17), and (25) surrounding a turntable at an equiangular interval of 90 degrees, and calculates these four camera positions.

The camera position is calculated as follows: select stereoscopic images, extract feature points and detect targets from the stereoscopic images, generate three-dimensional positional relationships (three-dimensional model), including camera positions (viewpoint positions), (relative orientation) by using the feature points and the targets, and provide a scale to the three-dimensional model (absolute orientation) by using known dimensions and known target positions.

The stereoscopic images to be selected are a pair of photographic images respectively taken from the camera positions that are adjacent with an interval of 90 degrees, such as pairs of the camera positions (1) and (9), (9) and (17), and (17) and (25). After the four camera positions (1), (9), (17), and (25) are calculated, bundle adjustment calculation is performed to minimize error.

Figure 4:
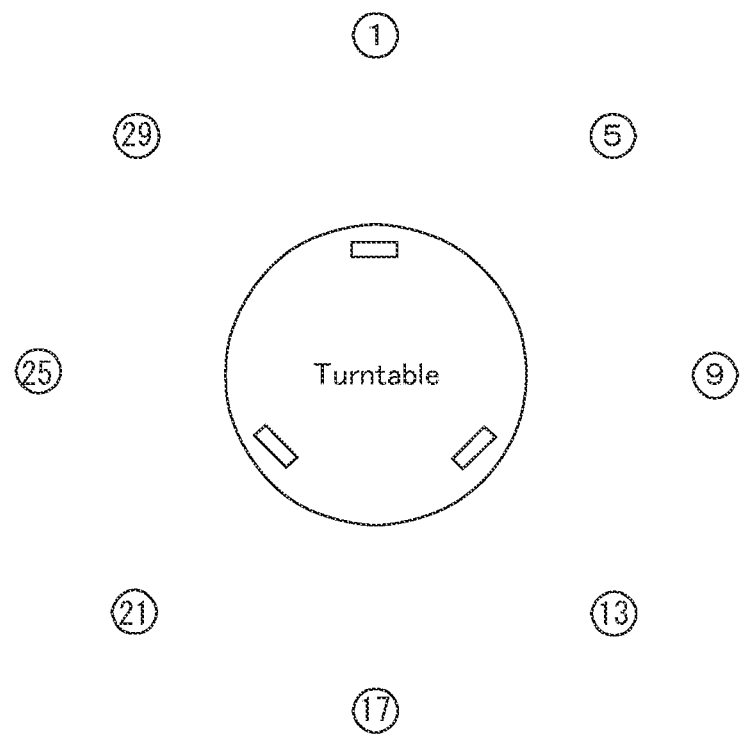
FIG. 4 is a principle diagram of an example of the invention.

After the four camera positions shown in FIG. 3 are calculated, the processing advances to a process shown in FIG. 4. The process in FIG. 4 is similar to the process in FIG. 3 and is performed on eight photographic images that are taken from eight positions: the camera positions (1), (9), (17), and (25), which are already calculated at the previous stage in FIG. 3; and other four camera positions (5), (13), (21), and (29) turned by 45 degrees from those camera positions.

At this time, the already calculated four camera positions (1), (9), (17), and (25) in FIG. 3 are used as initial values (which can also be understood as constraint points), and the new camera positions (5), (13), (21), and (29) are calculated. The camera positions (1), (9), (17), and (25) in FIG. 4 are initial values, but are not determined values, and these camera positions are recalculated so that all camera positions, including the new camera positions, will be optimized. In this manner, the eight camera positions at an equal interval (45 degrees) on the circumference of the circle centering on the turntable are calculated relative to the turntable. At this stage, bundle calculation is also performed to minimize error.

After the camera positions in FIG. 4 are calculated, the camera positions (5), (13), (21), and (29) are turned by 22.5 degrees, and a similar process is performed. As a result, 12 camera positions are calculated. This process is repeated until all camera positions are calculated. In the method shown in FIGS. 3 and 4, if calculation error occurs, it does not accumulate or is small. Thus, gradual increase in error as the calculation processing advances is suppressed.

This method first calculates all camera positions by gradually increasing the density of the number of the camera positions, such as four directions, eight directions, . . . , etc. At the same time, corresponding points are obtained by rough stereo matching. In addition, error minimization (bundle adjustment) is also performed.

Consequently, the camera positions are calculated by using all images. In addition, images having a long baseline (in this example, at positions differing from each other by 90 degrees) are used for initial values, and the camera positions form a closed loop as a whole, and these conditions contribute to high accuracy. The bundle adjustment at each step is performed by resetting initial values, and therefore, convergence is not prolonged nor fails (convergence is achieved rapidly because correct initial values are used).

After the camera positions are calculated, a dense three-dimensional point cloud is calculated by stereo matching using adjacent camera positions again, as a point cloud of the measurement target object. This calculation also uses a sparse point cloud that is obtained at the time of determining the camera position. At this stage, the camera positions are already calculated, and thus, bundle adjustment is not performed (of course, bundle adjustment may be performed). Note that the position matching may be performed by an ICP method, instead of the bundle adjustment.

The number of multiple camera positions surrounding the turntable (measurement target object) should be three or more. The "positions surrounding the turntable" are specified as three or more camera positions (viewpoint positions) at apexes of a polygon that encloses the turn center of the turntable, as viewed from a turn axis direction (vertical direction) of the turntable.

The movement angle θ at an M-th time in the method in FIGS. 3 and 4 is derived by θ=(360 degrees/(N×(M+1))), in which N is a number of angular positions at an equal angle of three or more. For example, in the case in FIG. 4, M=1 and N=4, whereby θ=45 degrees. Note that the value θ may not be an exact angle. If a camera does not exist at the position that is determined by the above mathematical formula (which situation can occur depending on photographing timing), a camera position close to that position may be selected.

The camera position is selected on the basis of data of an angular position of the turntable and photographing timing, in the method in FIGS. 3 and 4. The angular position of the turntable can be obtained by a sensor for measuring turning of the turntable, such as a rotary encoder. The photographing timing can be obtained from stored log data of output timing of a control signal for controlling the photographing timing of the camera.

Photographic images for constituting stereoscopic images are taken from mutually different camera positions. For these photographic images, two photographic images that are respectively taken from two camera positions are used basically. However, it is also possible to use three or more photographic images that are taken from three or more different viewpoints. If an actual camera position deviates from a required angular position of the camera, an actual camera position closest to the required camera position is employed.

2. Overall Configuration

Figure 7:
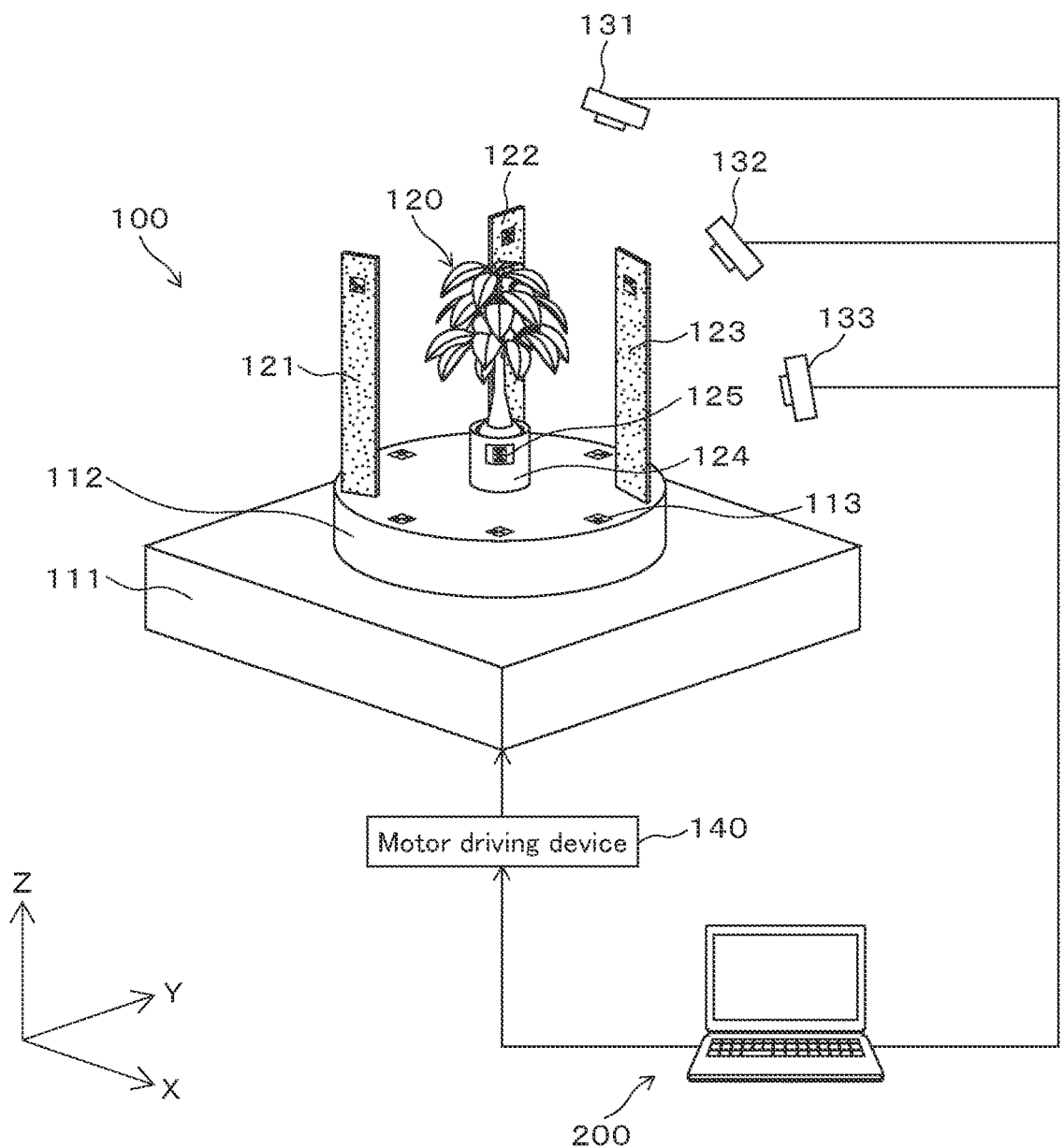
FIG. 7 is a schematic drawing of an embodiment.

FIG. 7 shows a three-dimensional measurement system 100 for obtaining three-dimensional data of a plant 120. The three-dimensional measurement system 100 includes a base 111 and a turntable 112 that is turnable on the base by a driving means, such as a motor. A plant 120 as a measurement target object for three-dimensional measurement is placed on the turntable 112.

The three-dimensional measurement system 100, including the base 111 and the turntable 112, have a background that has color (in this example, blue) different from the color of the plant 120. This color is desirably a monotone color different from the color of the plant 120. In one example in which the plant 120 has greenish color, a monotone color different from the color of the plant 120, such as blue, yellow, black, or white, is selected. The plant 120 is planted in a pot 124 on which a two-dimensional bar code mark 125 for identification is displayed.

The dimension of each part of the base 111 and the turntable 112 is obtained in advance as known data. A target 113 to be used as a reference point is shown on the top of the turntable 112. Multiple targets 113 are disposed at three or more positions. The targets 113 are coded targets with two-dimensional codes, and each is individually identifiable. The position on the turntable 112 of each target is examined in advance and is thereby known.

Random-dot-patterned columns 121 to 123 as identification members for image matching are fixed on the top of the turntable 112. The random-dot-patterned columns 121 to 123 are longitudinal plate members extending vertically upward from the turntable 112 and showing random dot patterns on their surfaces. The surfaces of the random-dot-patterned columns 121 to 123 show identification codes, in addition to the random dot patterns, and the identification codes are individually identifiable. The random-dot-patterned column can be a circular pillar or a polygonal pillar (for example, a quadrangular pillar or a pentagonal pillar).

The number of the random-dot-patterned columns may be four or more. However, since the random-dot-patterned columns exist between cameras 131 to 133 and the plant 120 as a measurement target object, an excessive number of random-dot-patterned columns interfere with photographing of the plant 120 by the cameras 131 to 133.

The positional relationships of the random-dot-patterned columns 121 to 123 relative to the turntable 112 are known in advance, and dimensions (width, length, and thickness) of the random-dot-patterned columns 121 to 123 are also known in advance. The random-dot-patterned columns 121 to 123, which have known dimensions, are also used as scales. A scale may be placed on the turntable 112 or may be displayed on the turntable 112. The longitudinal dimensions (vertical dimensions) of the random-dot-patterned columns 121 to 123 are set so that the tops of the random-dot-patterned columns 121 to 123 will be higher than the top of the plant 120 as a measurement target object. In addition, the random-dot-patterned columns 121 to 123 are disposed so as to surround the measurement target object (plant 120) in a top view. The same applies to a case of increasing the number of the random-dot-patterned columns.

The random dot pattern is a dot pattern having circular dots that are irregularly distributed at random. Techniques relating to the random dot pattern are disclosed in, for example, Japanese Unexamined Patent Applications Laid-Open Nos. 11-39505 and 10-97641, and IEICE (The Institute of Electronics, Information and Communication Engineers) report. COMP, Computation 112(24), 51-58, 2012-05-07. The color of the random dot pattern may be monotone or multi-color. In this example, a black random dot pattern with a white background is shown.

The cameras 131 to 133 are disposed around the turntable 112. The cameras 131 to 133 are fixed relative to the base 111 and repeatedly photograph the turntable 112 and the plant 120 on the turntable 112 at a predetermined time interval while the turntable 112 turns. The number of cameras is at least one, but it is desirable to dispose multiple cameras, and the number and the positions of the cameras are desirably set so as to reduce blindspots of the plant 120 as much as possible. The cameras 131 to 133 are digital cameras, and data (image data) of photographic images that are taken, is transmitted to a three-dimensional measurement device 200.

The plant 120 is consecutively photographed by the cameras 131 to 133, which are fixed to the base 111, during turning of the turntable 112. This provides multiple photographic images of the plant 120 that are taken from many surrounding camera positions (viewpoints). At this time, it is set so that photographing ranges of photographic images taken from adjacent camera positions will partially overlap.

The photographing as described above provides multiple photographic images of the plant 120 as a measurement target object that are taken from surroundings. Herein, photographic images are taken from adjacent viewpoints (camera positions) so as to contain images that partially overlap. In one example, it is assumed that 72 photographic images are taken by a camera directed to the plant 120, during one turn of the turntable 112. In this case, in terms of a coordinate system fixed relative to the turntable 112, photographing is performed by slightly moving the viewpoint position (camera position) by 360 degrees/72=5 degrees, on the circumference of the circle centering on the turn center of the turntable 112, whereby 72 photographic images are obtained.

3. Three-Dimensional Measurement Device

A three-dimensional model of the plant 120 as a measurement target object is generated on the basis of a publicly known principle of three-dimensional photogrammetry. The three-dimensional measurement device 200 is constructed by using a general purpose personal computer (PC). The three-dimensional measurement device 200 generates a three-dimensional model of the plant 120 on the basis of data of photographic images taken by the cameras 131 to 133. The three-dimensional measurement device 200 transmits a control signal to a motor driving device 140 to control turning of the turntable 112. Moreover, the three-dimensional measurement device 200 controls photographing timing of the cameras 131 to 133.

The three-dimensional measurement device 200 is a computer including a CPU, a memory device, and each type of interface, and can be constructed of general purpose or dedicated hardware. An example of general purpose hardware for constructing the three-dimensional measurement device 200 includes a workstation (WS), instead of a PC. An operation program for implementing functions of the three-dimensional measurement device 200 is installed in such a computer, and the software implements the function of each functional unit described below.

Note that a part of or the entirety of the three-dimensional measurement device 200 may be composed of a dedicated arithmetic circuit. A functional unit that is implemented by software, and a functional unit that is composed of a dedicated arithmetic circuit, may be used together.

For example, each of the functional units shown in the drawing is composed of an electronic circuit or a processor, such as a central processing unit (CPU), an application specific integrated circuit (ASIC), or a programmable logic device (PLD) which is represented by a field programmable gate array (FPGA). In addition, one or more of the functions may be implemented by dedicated hardware, and other functions may be implemented by a general purpose microcomputer.

The functions of the three-dimensional measurement device 200 may be implemented by a server, and a PC, a tablet, a smartphone, or the like may be connected to the server via an internet and be used as an operation interface terminal.

The three-dimensional measurement device 200 includes an image data receiving unit 210, a camera position selecting unit 220, a stereoscopic image selecting unit 221, a target detector 240, an exterior orientation parameter calculator 245, a feature point extracting unit 250, a corresponding point determining unit 260, a three-dimensional coordinate calculator 270, a three-dimensional model generator 280, a storage 290, a turn controlling unit 295, a photographing timing controlling unit 296, and a bundle adjustment calculator 297. Moreover, the three-dimensional measurement device 200 has an interface function for allowing exchange of data with an external device and has a user interface function for receiving operations of an operator. These functions use interfaces of a PC to be used.

The image data receiving unit 210 receives data (image data) of photographic images taken by the cameras 131 to 133 and stores this data in the three-dimensional measurement device 200.

Figure 5:
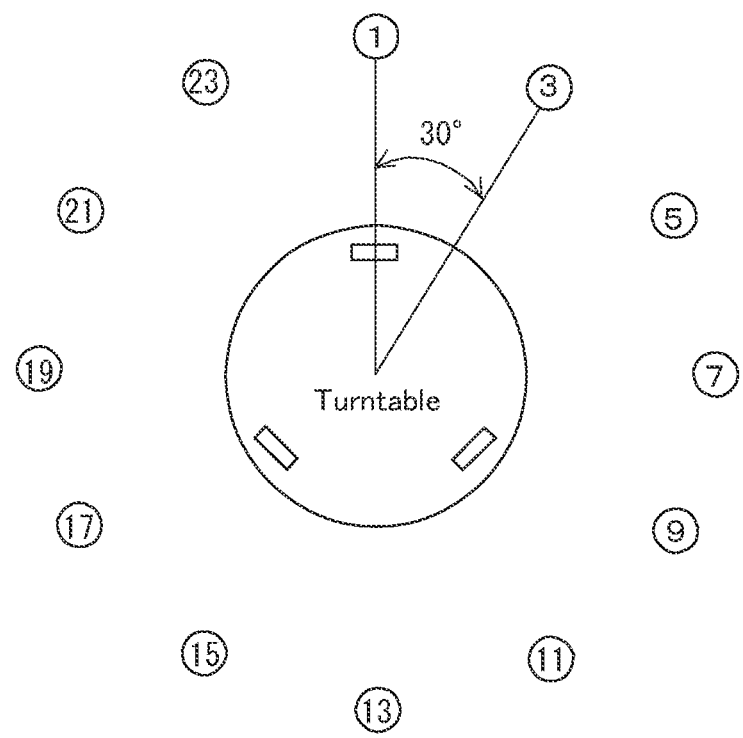
FIG. 5 is a principle diagram of an example of the invention.

The camera position selecting unit 220 selects candidates for camera positions to be calculated by a method of intersection and resection, as shown in FIG. 5. The selection of the camera positions is performed before the camera position is calculated by a method of intersection and resection, and thus, exact coordinates of the camera position are still not known. However, approximate positions of the cameras 131 to 133 relative to the turntable 112 can be determined from the contents of turn control of the turntable 112 and the contents of photographing timing control of the cameras 131 to 133, and photographing images taken from the approximate positions can be selected. This process is performed by the camera position selecting unit 220.

For example, the turn position of the turntable 112 is measured by a rotary encoder or the like, and thus, the turn position of the turntable 112 in terms of time axis can be known. The camera position at the time of photographing can be known from this information and data of the photographing time. In one example, the camera positions (1) and (9) can be determined. These camera positions are approximate and do not have an accuracy high enough to be used in three-dimensional photogrammetry.

Figure 6:
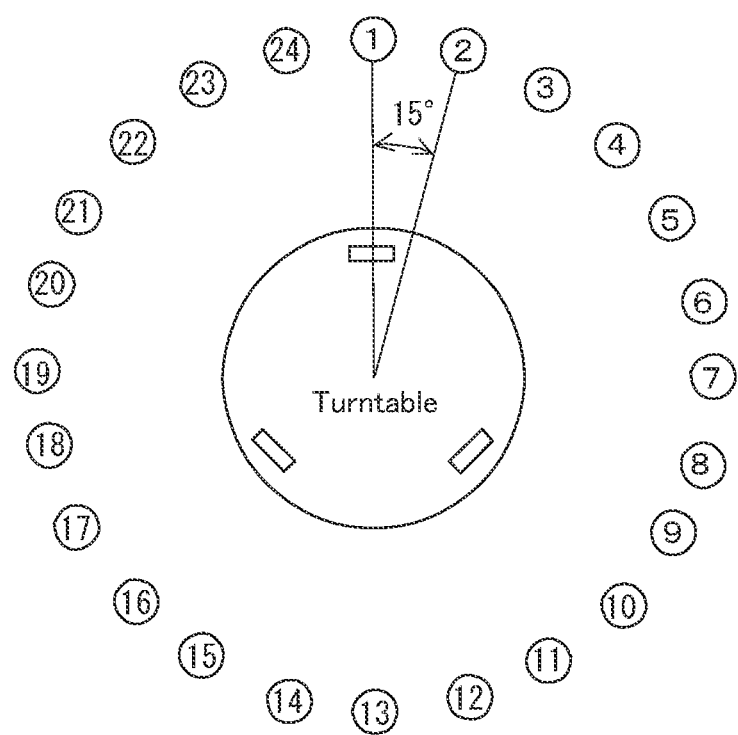
FIG. 6 is a principle diagram of an example of the invention.

The stereoscopic image selecting unit 221 selects two or more photographic images that contain the same object but taken from different viewpoints, as stereoscopic images. In one example, photographic images of the turntable 112 taken from the positions (1) and (5) in FIG. 5, or photographic images of the turntable and the plant 120 on the turntable taken from the positions (1) and (17) in FIG. 6, are selected as stereoscopic images. The stereoscopic images are basically composed of a pair of two images, but it can be composed of a set of three or more images. Note that the image is required to contain, at least, the turntable 112, the plant 120 as a measurement target object, and one of the random-dot-patterned columns 121 to 123.

The target detector 240 detects the target 113 that is contained in the photographic image taken by each of the cameras 131 to 133. The image of the target 113 is obtained in advance, and this image is used as a reference for extracting the target 113 from the photographic image. The target 113 is identifiable, and the position on the turntable 112 of the target 113 is already known. Thus, the respective positions of the multiple targets 113 are measured by the target detector 240.

Figure 9A:
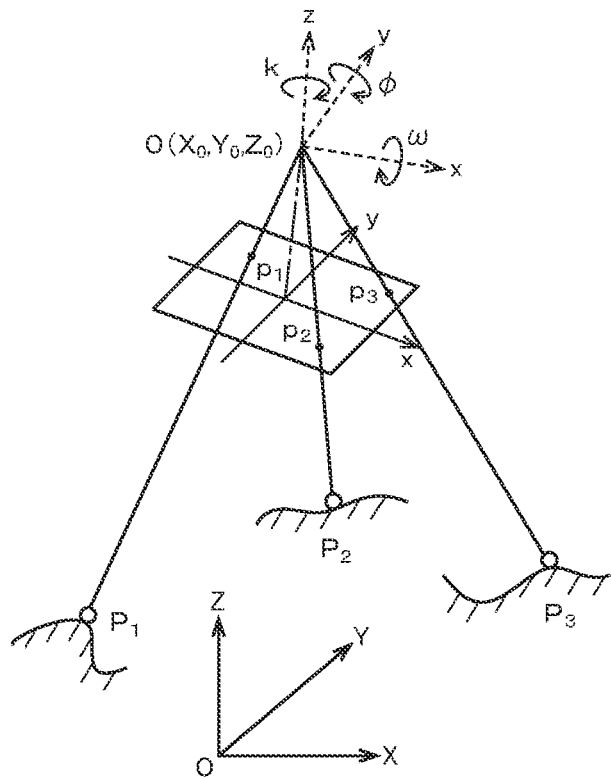
FIG. 9A is a principle diagram showing a principle of a method of resection.

The exterior orientation parameter calculator 245 calculates exterior orientation parameters (position and attitude) of the cameras 131 to 133 in FIG. 7, based on a method of resection by using feature points in the photographic images (feature points extracted by the feature point extracting unit 250). FIG. 9A shows a principle of a method of resection. The method of resection determines a position of an unknown point at an intersection point of directional lines in directions for observing three or more known points from the unknown point. Examples of the method of resection include a single photo orientation and a direct liner linear transformation (DLT) method. Details of the method of intersection and resection are described in "Technology of Positioning Solutions" (published by DENKISHOIN on April, 2010) on pages 182 and 184. Additionally, a specific example of a calculation method in the method of intersection and resection is disclosed in Japanese Unexamined Patent Application Laid-Open No. 2013-186816.

The following describes a specific example of calculation. Herein, it is assumed that the turntable 112 is photographed by the camera 132 at the time before and after the turntable 112 is turned by 30 degrees. The 30-degree turn is controlled by the turn controlling unit 295, whereas the photographing timing is controlled by the photographing timing controlling unit 296. In this example, while the turning is continued at a constant speed, the turn timing of the turntable 112 and the photographing timing of the camera 132 are controlled so that photographing can be performed at positions that differ from one another by 30 degrees in a top view.

In this situation, in terms of the coordinate system fixed relative to the turntable 112, photographic images that are taken from the positions (1) and (3) in FIG. 5 are obtained. These two photographic images are assumed to be stereoscopic images, and feature points are extracted therefrom. Then, matching (determination of correspondence relationships) of the extracted feature points between these stereoscopic images is performed. The feature points are extracted by the feature point extracting unit 250, whereas corresponding points are determined by the corresponding point determining unit 260.

After the correspondence relationships of the feature points between the stereoscopic images that are taken from the camera positions (1) and (3) in FIG. 5, are determined, the camera positions (1) and (3) are calculated by using a method of resection in FIG. 9A. Herein, the camera position is described in a local coordinate system that has an origin at the turn center of the turntable 112 and that is fixed relative to the turntable 112.

For example, exterior orientation parameters (attitude and position) of the camera at the camera positions (1) and (3) in FIG. 5 are calculated by the method as described below. First, it is assumed that the top surface of the turntable 112 is flat, and feature points that are extracted therefrom are positioned on a plane of this flat surface. In addition, the random dots on the surfaces of the random-dot-patterned columns 121 to 123 are distributed on a vertical plane. On the basis of these constraint conditions, position and attitude at each of the camera positions (1) and (3) in a relative three-dimensional model are determined by relative orientation.

In one example, among feature points corresponding between the stereoscopic images, which are obtained from the dots of the random-dot-patterned columns 121 to 123, $P_1$, $P_2$, and $P_3$ in FIG. 9A are selected. There is a constraint condition that $P_1$, $P_2$, and $P_3$ are distributed in a vertical plane. Assuming that the positions in the image of $P_1$, $P_2$, and $P_3$ are represented as $p_1$, $p_2$, and $p_3$, three directional lines respectively connecting $P_1$ and $p_1$, $P_2$ and $p_2$, and $P_3$ and $p_3$ are set. An intersection point O of the three directional lines is the position (projection center) of the camera 132 that takes the corresponding photographic image. In addition, an extended direction of the directional line connecting the point O and the center of the image corresponds to an optical axis direction of the camera 132, whereby the direction (attitude) of the camera 132 is determined.

At this stage, the absolute positional relationships between $P_1$, $P_2$, and $P_3$ are still not known, and the three-dimensional model in FIG. 9A is a relative three-dimensional model in this case. This process for obtaining the relative three-dimensional model is relative orientation.

On the condition that $P_1$ and $P_2$ are end points of the top side of the random-dot-patterned column 121, coordinates of the end points in the local coordinate system fixed relative to the turntable 112 are already known, and thus, a scale is provided to the relative three-dimensional model. Absolute orientation is thus performed, which reveals exterior orientation parameters in the corresponding coordinate system of the camera. This method can also use position information of the multiple targets 113 together.

The exterior orientation parameters of the camera at each camera position can also be determined from position information of three or more targets 113. In one example, it is assumed that three targets 113 are viewed from the position (1) in FIG. 5. In this case, under the condition that the positions of the three targets 113 are represented as $P_1$, $P_2$, and $P_3$, of which positions are already known, the coordinates of the point O are determined. In addition, the direction connecting the point O and the center of the image reveals the attitude of the camera. In this manner, the exterior orientation parameters of the camera at the position (1) from which the three targets 113 are viewed, are determined.

Figure 9B:
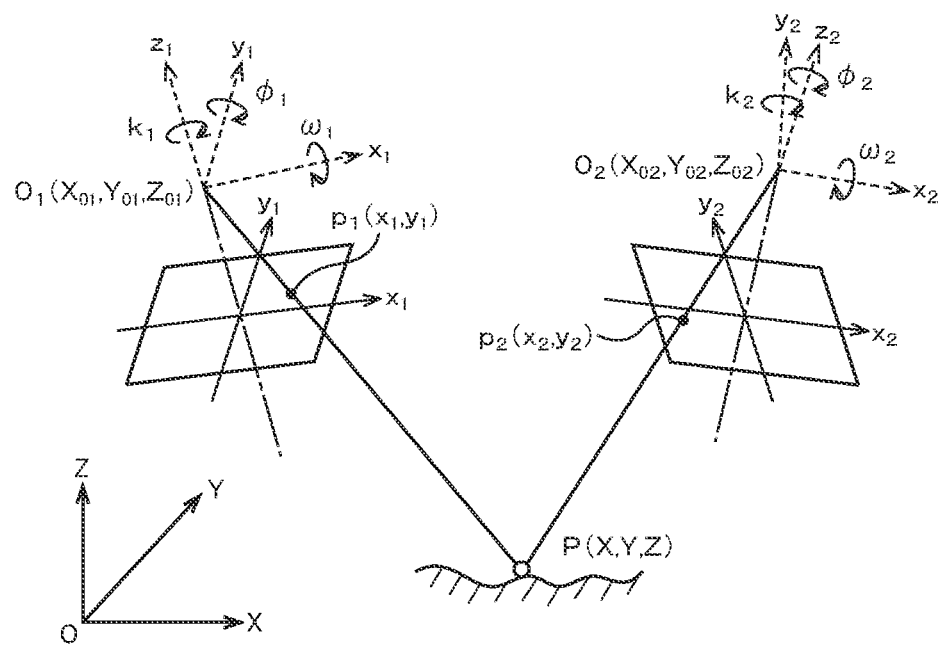
FIG. 9B is a principle diagram showing a principle of a method of intersection.

Under the condition that the camera position is determined, unknown positions of a large number of feature points in the corresponding coordinate system (local coordinate system fixed relative to the turntable 112), can also be calculated by a method of intersection in FIG. 9B. After the positions of the large number of feature points are determined, the camera positions are also calculated based on these positions by a method of resection in FIG. 9A.

In a practical case, numerical formulas for calculating the exterior orientation parameters of the cameras 131 to 133 in the series of the methods are calculation formulas having many matrix elements, including the coordinates of the large number of feature points. These calculation formulas are repeatedly calculated until unknown numbers converge, whereby the exterior orientation parameters of the cameras 131 to 133 are determined. Moreover, bundle adjustment is calculated by the bundle adjustment calculator 297 at an appropriate timing to minimize error.

The feature point extracting unit 250 extracts feature points from the photographic images taken by the cameras 131 to 133. The feature point to be extracted is a point being distinctive from surroundings, such as an edge part or a part having color or brightness different from surroundings. The extraction of the feature point is performed by software processing. The extraction of the feature point uses a differential filter, such as a Sobel filter, a Laplacian filter, a Prewitt filter, or a Roberts filter.

The corresponding point determining unit 260 determines correspondence relationships between feature points that are respectively extracted from two or more photographic images taken from different viewpoints. That is, a feature point that is the same as the feature point extracted in one image, is determined in another image. The determination of correspondence relationships between the feature points uses, for example, SIFT, SURF, or Kaze as a feature-based (feature-extraction) method, or template matching as an area-based (area-correlation) method. Examples of the template matching include a sequential similarity detection algorithm (SSDA) method and a cross-correlation coefficient method. The corresponding points are determined basically on the basis of two images or two pieces of point cloud position data, but they can be determined on the basis of three or more images or three or more pieces of point cloud position data.

The technique for determining correspondence relationships between multiple images can employ a technique as disclosed in, for example, Japanese Unexamined Patent Applications Laid-Open Nos. 2013-178656 and 2014-35702. Note that Japanese Unexamined Patent Applications Laid-Open Nos. 2013-178656 and 2014-35702 also disclose techniques relating to extraction of feature points and determination of a three-dimensional position of a feature point, and these techniques can also be employed in the techniques described in the specification of the present application.

The three-dimensional coordinate calculator 270 calculates a three-dimensional position of the feature point, which is extracted from the image by the feature point extracting unit 250 by a method of intersection. The calculation of the three-dimensional positions of a large number of feature points constituting a target object provides point cloud position data that enables understanding the target object as a set of points of which three-dimensional coordinates are determined. Moreover, a three-dimensional model can be generated based on this point cloud position data.

FIG. 9B shows a principle of a method of intersection. The method of intersection determines the position of an unknown point P at an intersection point of directional lines in directions for observing the unknown point P from multiple different points (two points of $O_1$ and $O_2$ in the case in FIG. 9B).

FIG. 9B shows a case in which the same region is photographed from different camera positions $O_1$ and $O_2$ by a camera of which exterior orientation parameters are already known. Herein, image coordinates in one image of an unknown point P are at $p_1$, and image coordinates in the other image of the unknown point P are at $p_2$. The camera positions $O_1$ and $O_2$ are already known, and attitude of the camera at each of these camera positions is also known. Thus, coordinates of an intersection point P of a directional line connecting $O_1$ and $p_1$ and a directional line connecting $O_2$ and $p_2$ can be calculated.

The three-dimensional model generator 280 generates a three-dimensional model on the basis of three-dimensional point cloud position data, which is obtained by analyzing a large number of photographic images. For example, a tin (triangulated irregular network) is created by using the obtained three-dimensional point cloud position data containing three-dimensional coordinates of the large number of feature points, and a three-dimensional model of a photographed object is generated. The technique for generating a three-dimensional model on the basis of point cloud position data is disclosed in, for example, WO 2011/070927 and Japanese Unexamined Patent Applications Laid-Open Nos. 2012-230594 and 2014-35702. The three-dimensional coordinate system to be used is, for example, a local coordinate system having an origin at the turn center of the turntable 112.

The storage 290 stores various data to be used by the three-dimensional measurement device 200, an operation program, various data obtained as a result of operation, etc. Instead of, or in addition to, the storage 290, an external storage device (such as an external hard disk device or a data storage server) can also be used.

The turn controlling unit 295 transmits a control signal to the motor driving device 140 (refer to FIG. 7) that drives a motor (not shown) for turning the turntable 112, and thereby controls operation of the motor. The turn controlling unit 295 sets turn timing and turn speed of the turntable 112. The turning of the turntable 112 is measured by a rotary encoder, and the turn controlling unit 295 controls turning of the turntable 112 based on this measured value.

The photographing timing controlling unit 296 controls photographing operation by transmitting a control signal for determining photographing timing, to the cameras 131 to 133. The cameras 131 to 133 photograph the turntable 112 and the plant 120 placed on the turntable 112 during turning of the turntable 112, under control of the photographing timing controlling unit 296. In one example, while the turntable 112 is turned at a turn speed of 5 to 10 turns/minute, each of the cameras 131 to 133 repeatedly takes still images at a time interval of 0.1 to 0.5 seconds.

4. Example of Processing

The following describes an example of processing for obtaining point cloud position data of the plant 120 on the turntable 112 and then generating a three-dimensional model of the plant 120 based on this point cloud position data. The following processing is performed by using the three-dimensional measurement system 100. The program for executing the processing described below is stored in the storage 290 and is executed by the three-dimensional measurement device 200. This program can be stored in an appropriate storage medium, a storage server, or the like, and can be provided therefrom.

Photographing

First, the position and the attitude of the cameras 131 to 133 are set so that the turntable 112 and the random-dot-patterned columns 121 to 123 can be photographed. Under these conditions, photographing is performed. The photographing is performed at a predetermined time interval by using the cameras 131 to 133 while the turntable 112 having the plant 120 as a measurement target object is turned at a constant speed.

The photographing is performed, for example, under the condition that 72 still images will be obtained at an equal time interval while the turntable 112 turns once at a constant speed, in other words, photographing will be performed 72 times from angles that are different from one another by 5 degrees. In this case, the three cameras 131 to 133 each take 72 photographic images, and 72×3=216 photographic images are obtained in total. This image data is transmitted to the three-dimensional measurement device 200 and is received by the image data receiving unit 210. The image data that is received by the image data receiving unit 210 is stored in the storage 290. The turn speed and a shutter release interval can be freely set in accordance with the type of the plant and the desired point cloud density.

After data of photographic images of the plant 120 is obtained, the background is removed from each of the photographic images. Details of this process are disclosed in, for example, Japanese Unexamined Patent Application Laid-Open No. 2018-197685.

As a result, three sets of photographic images that are taken from 72 directions equally dividing a surrounding 360-degree circle in a vertical top view, that is, 72×3=216 photographic images, are obtained. The subsequent processing is performed on these 216 images.

Determination of Camera Position

The processing relating to determination of the camera position is performed for each of the cameras 131 to 133. First, multiple camera positions at equiangular positions are calculated by using the method shown in FIG. 5 (for example, FIG. 5 shows a case of selecting 12 camera positions).

Figure 10:
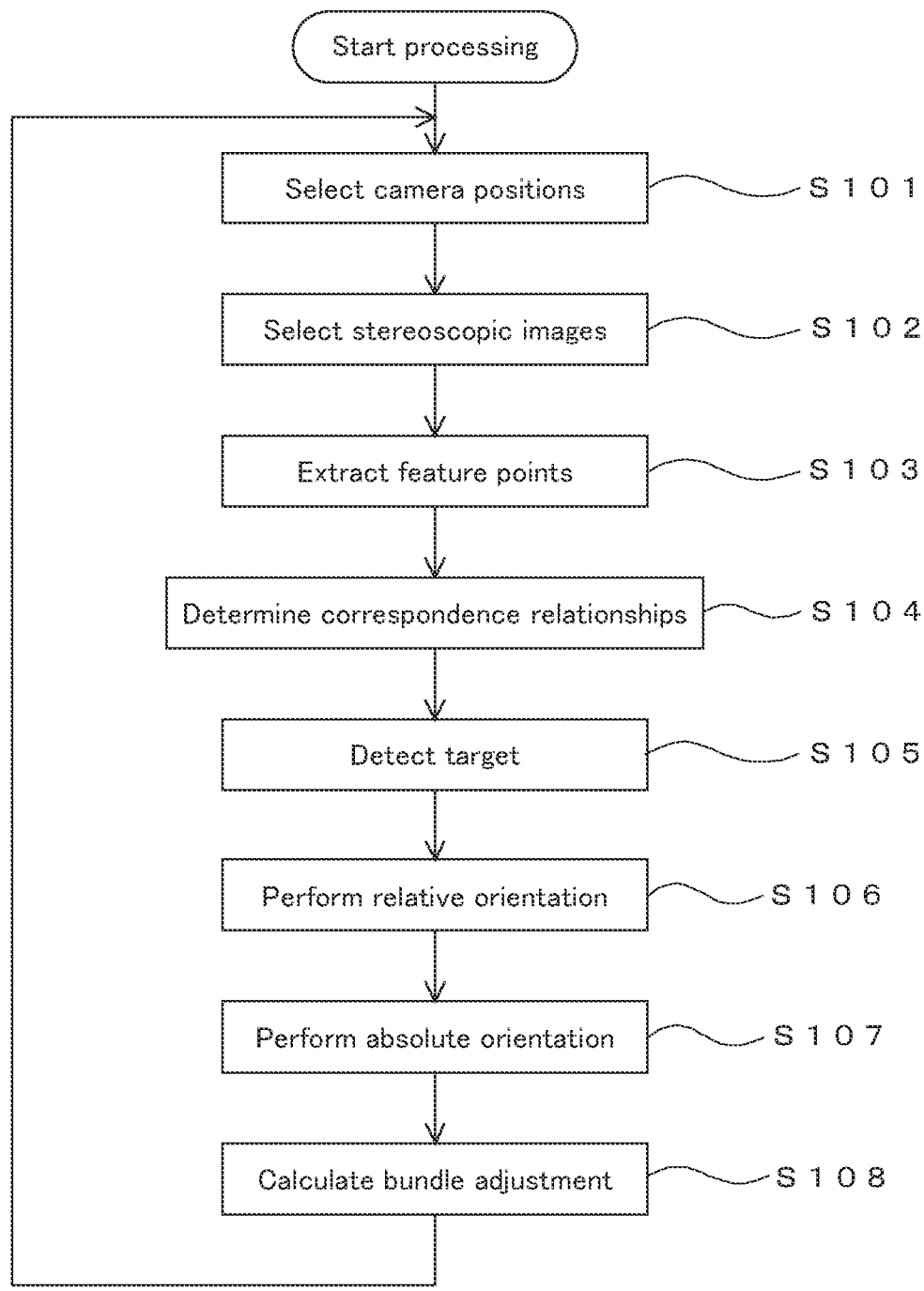
FIG. 10 is a flowchart showing an example of a processing procedure.

Herein, the 12 camera positions at equiangular positions (30 degrees) are determined by the method in FIG. 5. FIG. 10 shows an example of a procedure of this processing. First, 12 camera positions shown in FIG. 5 are selected (step S101). In one example, 12 camera positions that are different from one another by 30 degrees in a top view are selected. The selection of the camera positions at this stage is performed based on the turn position of the turntable 112 and the photographing timing of the cameras 131 to 133. This process is performed by the camera position selecting unit 220 in FIG. 8.

Then, stereoscopic images are selected from among photographic images taken from the positions selected in step S101 (step S102). In this case, in terms of camera positions, adjacent camera positions, such as the camera positions (1) and (3), (3) and (5), (5) and (7), etc., are selected as the camera positions of the stereoscopic images. That is, multiple pairs of stereoscopic images are selected as follows: stereoscopic images are composed of two photographic images taken from the camera positions (1) and (3), other stereoscopic images are composed of two photographic images taken from the camera positions (3) and (5), additional stereoscopic images are composed of two photographic images taken from the camera positions (5) and (7), etc. This process is performed by the stereoscopic image selecting unit 221 in FIG. 8.

Next, feature points are extracted from the selected stereoscopic images (step S103). This process is performed by the feature point extracting unit 250. The extracted feature points include feature points of the plant 120, the turntable 112, and the random-dot-patterned columns 121 to 123. Then, determination of correspondence relationships (stereo matching) of feature points between the stereoscopic images are performed (step S104). In addition, the target 113 that is contained in both of the stereoscopic images is detected (step S105).

Thereafter, based on a method of resection using the feature points in which the correspondence relationships are determined, relative orientation is performed by calculating relative positional relationships between the camera selected in step S101 and the feature points (step S106). At this time, relative positional relationships between the corresponding points contained in the stereoscopic images and the camera position are also determined by a method of intersection.

Next, absolute orientation is performed by adding a scale that is based on the feature points as well as actual dimensions that are based on the position of the target 113, to the relative positional relationships calculated in step S106 (step S107). This process determines the exterior orientation parameters (position and attitude) of the camera and also determines the positions of the feature points in which the correspondence relationships are determined in step S104. Lastly, bundle adjustment is calculated to minimize error (step S108).

Figure 8:
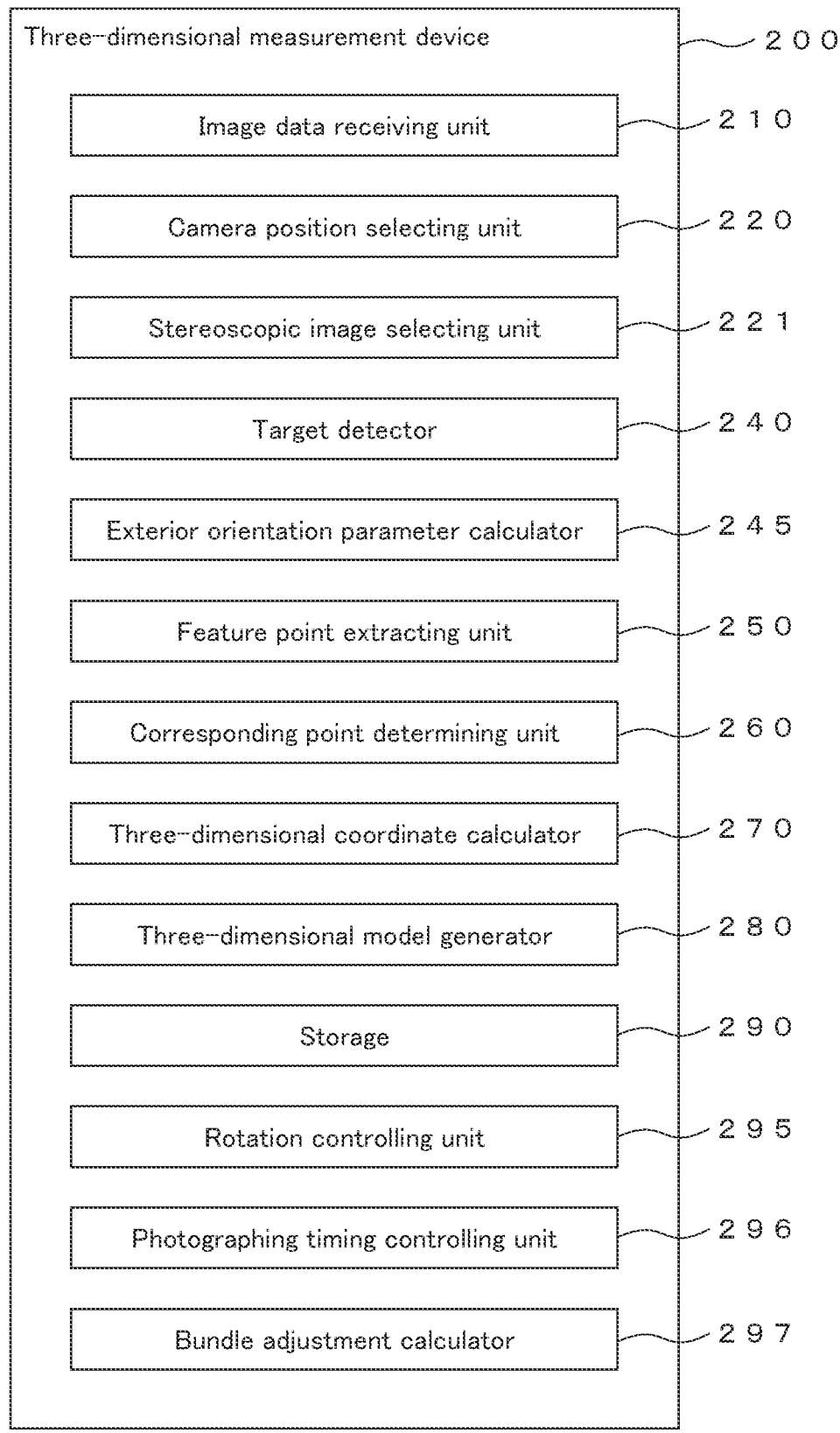
FIG. 8 is a block diagram of a three-dimensional measurement device of the embodiment.

The processes in S106 to S108 are performed by the exterior orientation parameter calculator 245, the three-dimensional coordinate calculator 270, and the bundle adjustment calculator 297 in FIG. 8. In accordance with the above-described processes, the camera positions are calculated. In one example, the camera positions (1), (3), (5), (7), . . . , and (23) in FIG. 5 are calculated. The above-described processes are performed for each of the cameras 131 to 133.

The above-described processes are repeated, whereby the camera positions are calculated while the number of the camera positions is gradually increased, with respect to all images.

For example, after the processes in S101 to S106 relating to FIG. 5 are performed, the processes in S101 to S106 are repeated with respect to new 12 camera positions as shown in FIG. 6. In this case, the new camera positions to be calculated are the camera positions (2), (4), (6), (8), (10), . . . , and (24) shown in FIG. 6, whereas the already calculated camera positions are the camera positions (1), (3), (5), (7), . . . , and (23) shown in FIG. 5. The new camera positions (2), (4), (6), (8), (10), . . . , and (24) are calculated by assuming the camera positions (1), (3), (5), (7), . . . , and (23) shown in FIG. 5 as initial values. At this time, the camera positions (1), (3), (5), (7), . . . , and (23) assumed as the initial values are recalculated.

The above-described process calculates all of the camera positions to be calculated at this stage, by using the already calculated camera positions as initial values. This calculation is repeated while the camera positions are increased, until all images are subjected to the calculation. In this manner, the camera positions are calculated for all images.

In one example, it is assumed that a measurement target object on the turntable is photographed from surrounding 72 camera positions at an equiangular interval. In this case, the processes shown in FIGS. 5 and 6 are repeated 6 times to calculate the camera positions of all 72 images. Specifically, a process of calculating 12 camera positions at a 30-degrees interval is performed 6 times in such a manner that the angle of each of the camera positions is moved by 15 degrees after the first calculation but before the second calculation, is moved by −10 degrees after the second calculation but before the third calculation, is moved by 15 degrees after the third calculation but before the fourth calculation, is moved by −10 degrees after the fourth calculation but before the fifth calculation, and is moved by 15 degrees after the fifth calculation but before the sixth calculation. In this manner, the camera positions of all of 12×6=72 images are calculated. Note that it is not necessary to set the multiple camera positions for the measurement target object at equiangular positions.

Three-Dimensional Measurement of Measurement Target Object

Figure 11:
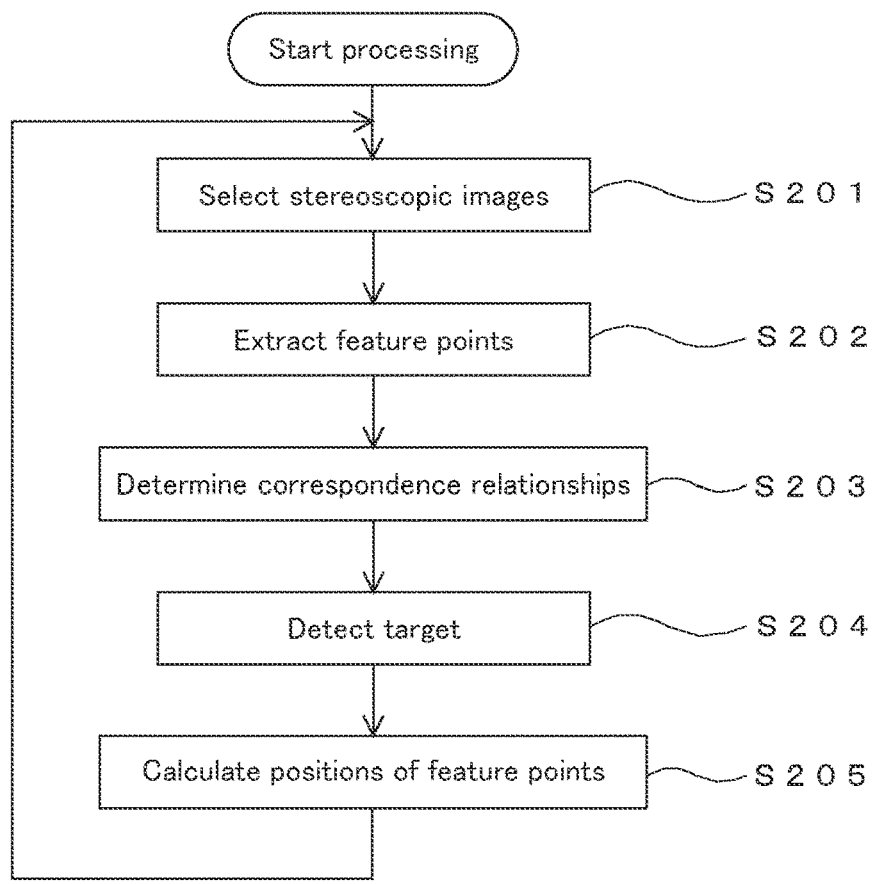
FIG. 11 is a flowchart showing an example of a processing procedure.

After the camera positions relative to the turntable 112 of all images are calculated, next, stereoscopic images are composed at adjacent camera positions, and three-dimensional coordinate positions of feature points that are extracted from the stereoscopic images are calculated. This process also uses the position data of the sparse point cloud that is calculated in the processing in FIG. 10. FIG. 11 is an example of a flowchart of this processing.

After the processing starts, two photographic images of the plant 120 that are taken from adjacent or neighboring viewpoint positions (camera positions), are selected as stereoscopic images (step S201). The candidates for the images to be selected are 216 photographic images in total taken by the cameras 131 to 133. This process is performed by the stereoscopic image selecting unit 221. The two images to be selected may be taken by different cameras. Note that it is also possible to select three or more photographic images containing the same object, as stereoscopic images.

Next, feature points are extracted from the stereoscopic images selected in step S201 (step S202). This process is performed by the feature point extracting unit 250 in FIG. 8. After feature points are extracted from the stereoscopic images, correspondence relationships of the extracted feature points between the stereoscopic images are determined (step S203). This process is performed by the corresponding point determining unit 260 in FIG. 8. In addition, the target 113 is detected from the stereoscopic image (step S204). This process is performed by the target detector 240. Detection of the target can be performed during steps S202 to S205.

Next, three-dimensional positions of the feature points in which the correspondence relationships between the stereoscopic images are determined in step S203, are calculated (step S205). At this time, the feature points in which the positions are determined in the process in FIG. 10 are used as initial values. This process is performed by the three-dimensional coordinate calculator 270. The three-dimensional position of the feature point is calculated in terms of coordinates in a coordinate system fixed relative to the turntable 112. This feature point in which the position is determined, constitutes a three-dimensional point cloud, whereby point cloud position data of the plant 120 is obtained.

Then, the processing returns to the stage before step S201, and the processes in step S201 and in the subsequent steps are repeated.

In one example, it is assumed that the camera positions (1) and (2), and the camera positions (2) and (3), are adjacent to each other. In this case, photographic images that are taken from the camera positions (1) and (2) in FIG. 6 (herein, the camera positions (1) and (2) are adjacent to each other) may be selected as stereoscopic images in the processes in step S201 and in the subsequent steps in the previous time. Thus, in the processes in step S201 and in the subsequent steps in the next time, the camera positions (2) and (3) in FIG. 6 (herein, the camera positions (2) and (3) are adjacent to each other), are selected.

In this manner, in response to selection of a new pair of the stereoscopic images, corresponding points that are still not known at the current stage (unknown feature points corresponding between the images constituting the stereoscopic images) are extracted, and the positions thereof are calculated. These processes are repeated, whereby three-dimensional positions of other feature points contained in both of the stereoscopic images, which are consecutively selected from among all images to be used, are calculated. This provides point cloud position data that represents the plant 120 as the three-dimensional measurement target object, in terms of a set of points with three-dimensional coordinates that have been revealed.

After the point cloud position data of the plant 120 is obtained, a three-dimensional model of the plant 120 is generated based thereon. This process is a publicly known existing process, and therefore, description thereof is omitted. Details of generation of a three-dimensional model are disclosed in, for example, WO 2011/070927 and Japanese Unexamined Patent Applications Laid-Open Nos. 2012-230594 and 2014-35702.

Conclusion

In this embodiment, first, while the number of the camera positions is gradually increased such that 12 directions, 24 directions, . . . , etc., a set of all of the 12 camera positions at an interval of 30 degrees, which are selected each time the number of the camera positions is increased, are calculated successively. At this time, the selected camera positions form a closed loop, and the calculation is repeated while the selected camera positions are gradually moved, whereby the camera positions relating to all images are calculated in the end.

This method can avoid accumulation of error. In addition, stereoscopic images having a long baseline, such as of the camera positions (1) and (2) in FIG. 5, are used as initial values, and the camera positions form a close loop as a whole, whereby calculation accuracy is high. The result of bundle adjustment at each step is used as an initial value in the next step, and therefore, convergence is not prolonged nor fails.

At the time of calculating the camera positions, corresponding points are also determined by rough stereo matching, and error thereof is also minimized by bundle adjustment calculation. After the camera positions are calculated, a dense three-dimensional point cloud is obtained by performing stereo matching on adjacent camera positions again. At this time, the position data of the sparse point cloud obtained in calculating the camera positions is used for constraint points. This facilitates convergence of the calculation of the dense three-dimensional point cloud and provides high calculation accuracy.

Other Matters

It is also possible to precisely control the turning of the turntable 112 and to pause and stop the turning at the time of photographing. This method can be utilized in a case of requiring a long exposure time in photographing or a case of waiting for vibration of a target object due to shaking to stop. In addition, the measurement target object is not limited to a plant.

The multiple camera positions surrounding the turntable can have a non-equal angle relationship. The number of the camera positions that are selected for an N-th time can be different from that for an (N+1)-th time in selecting the multiple camera positions surrounding the turntable. In addition, one or more camera positions that are selected for an N-th time can be the same as that for an (N+1)-th time in selecting the multiple camera positions surrounding the turntable.

The measurement target object may not be turned, but may be stopped, and instead, photographing may be performed by moving the camera, which is directed to the measurement target object, on a circumference of a circle. In this case, the angular position of the camera is understood based on the center of the circumference of the circle on which the camera moves. The positional relationship between the measurement target object and the camera may be relatively fixed. In this case, many cameras are disposed on a circumference of a circle centering on the measurement target object, and photographing is performed from each camera position. Thus, the angular position is understood based on the center of the circumference of the circle on which the cameras are disposed.

Modification Example 1

It is possible to perform the determination of the camera position shown in FIG. 10 only on some of the camera positions. For example, at the stage after 8 camera positions surrounding the measurement target object (turntable) shown in FIG. 4 are determined, the processing may advance to a process of consecutively calculating adjacent camera positions shown in FIG. 2. In this case, assuming the known camera positions (1), (5), (9), (13), (17), (21), (25), and (29) as initial values or constraint points, unknown camera positions and newly extracted feature points are calculated.

Modification Example 2

The bundle adjustment calculation may not be performed at each stage, but instead, it may be performed after calculation of all of the camera positions is completed.

Modification Example 3

In the case in FIG. 3, pairs of the camera positions (1) and (17), and (9) and (25), may be selected as stereoscopic images. That is, among the selected four camera positions (1), (9), (17), and (25), non-adjacent camera positions may be selected as stereoscopic images. The same applies to the cases in FIGS. 4 to 6.

Modification Example 4

Figure 12:
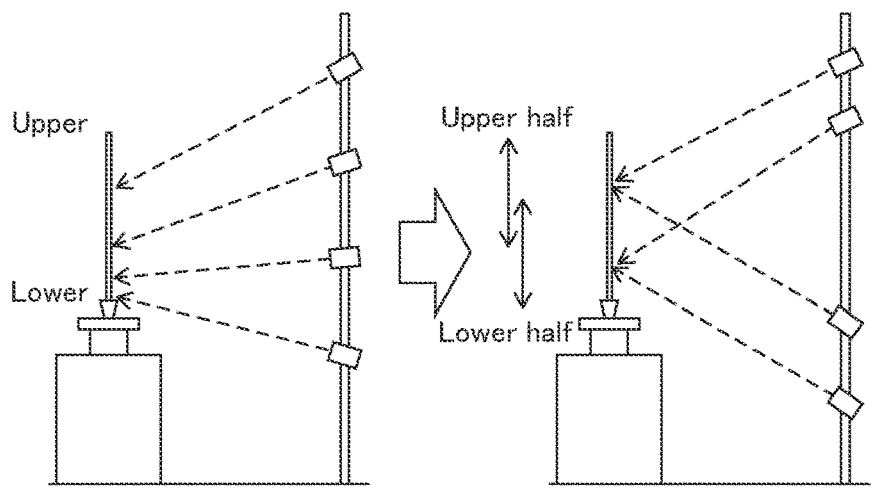
FIG. 12 shows camera positions in a vertical direction.

The camera arrangement as shown on the right side in FIG. 12 is effective in order to perform photographing without having blind spots. In the method shown in FIG. 12, at least four cameras are vertically arranged; two lower cameras are directed obliquely upward, and two upper cameras are directed obliquely downward. An upper side of the measurement target object is photographed by the camera that is disposed on a relatively upper side so as to face obliquely downward, and by the camera that is disposed on a relatively upper side so as to face obliquely upward. In addition, a lower side of the measurement target object is photographed by the camera that is disposed on a relatively lower side so as to face obliquely downward, and by the camera that is disposed on a relatively lower side so as to face obliquely upward. Naturally, the photographing ranges of the pair of the cameras in the vertical direction partially overlap. This suppresses generation of blind spots in the photographing area in the vertical direction.

REFERENCE SIGNS LIST

100 . . . 3D measurement system, 111 . . . base, 112 . . . turntable, 113 . . . target, 120 . . . plant as a measurement target object, 121 to 123 . . . random-dot-patterned columns, 124 . . . pot, 125 . . . two-dimensional bar code mark, 131 to 133 . . . cameras, 200 . . . 3D measurement processor implemented by PC

The invention claimed is:

1. A three-dimensional measurement device comprising:
a processor or circuitry configured to:
receive data of multiple photographic images, the photographic images being obtained by photographing a measurement target object and a random dot pattern from multiple surrounding viewpoints by use of a camera;
select three or more camera positions surrounding the measurement target object, from among multiple positions of the camera from which the multiple photographic images are taken;
select the photographic images as stereoscopic images from among the photographic images that are taken from the selected three or more camera positions; and
calculate the camera position from which the stereoscopic images are taken, by a method of intersection and resection using the stereoscopic images, wherein
the selection of the camera positions is performed multiple times in such a manner that at least one different camera position is selected each time,
the random dot pattern is formed on a surface of a longitudinal member that stands upward and is fixed on a table on which the measurement target object is placed, and
the longitudinal member has a height greater than a height of the measurement target object placed on the table.

2. A three-dimensional measurement device comprising:
a processor or circuitry configured to:
receive data of multiple photographic images, the photographic images being obtained by photographing a measurement target object and a random dot pattern from multiple surrounding viewpoints by use of a camera;
select three or more camera positions surrounding the measurement target object, from among multiple positions of the camera from which the multiple photographic images are taken;
select the photographic images as stereoscopic images from among the photographic images taken from the selected three or more camera positions; and
calculate the camera position from which the stereoscopic images are taken, by a method of intersection and resection using the stereoscopic images, wherein
the selection of the camera positions is performed multiple times in such a manner that different camera positions are selected each time, the random dot pattern is formed on a surface of a longitudinal member that stands upward and is fixed on a table on which the measurement target object is placed, and the longitudinal member has a height greater than a height of the measurement target object placed on the table.

3. The three-dimensional measurement device according to claim 1, wherein the selection of the camera positions comprises:

performing first selection of selecting N number of camera positions at angular positions mutually separated by 360 degrees/N, N being a natural number of 3 or greater, as viewed from the measurement target object; and performing second selection of selecting N number of camera positions at angular positions that are moved by 180 degrees/N, from the N number of the camera positions selected in the first selection, as viewed from the measurement target object.

4. The three-dimensional measurement device according to claim 1, wherein the table is turnable.

5. The three-dimensional measurement device according to claim 4, wherein the camera photographs the measurement target object while the table is turned relative to the camera, whereby data of multiple photographic images of the measurement target object and the random dot pattern taken from multiple surrounding viewpoints is obtained, and a turn center of the measurement target object is positioned within a polygon that has apexes at three or more positions surrounding the measurement target object.

6. A three-dimensional measurement method comprising:
receiving data of multiple photographic images, the photographic images being obtained by photographing a measurement target object and a random dot pattern from multiple surrounding viewpoints by use of a camera;

selecting three or more camera positions surrounding the measurement target object, from among multiple positions of the camera from which the multiple photographic images are taken;

selecting the photographic images as stereoscopic images from among the photographic images taken from the selected three or more camera positions; and calculating the camera position from which the stereoscopic images are taken, by a method of intersection and resection using the stereoscopic images, wherein the selection of the camera positions is performed multiple times in such a manner that at least one different camera position is selected each time, the random dot pattern is formed on a surface of a longitudinal member that stands upward and is fixed on a table on which the measurement target object is placed, and the longitudinal member has a height greater than a height of the measurement target object placed on the table.

7. A non-transitory computer recording medium storing computer executable instructions that, when executed by a computer processor, cause the computer processor to:

receive data of multiple photographic images, the photographic images being obtained by photographing a measurement target object and a random dot pattern from multiple surrounding viewpoints by use of a camera;

select three or more camera positions surrounding the measurement target object, from among multiple positions of the camera from which the multiple photographic images are taken;

select the photographic images as stereoscopic images from among the photographic images taken from the selected three or more camera positions; and calculate the camera position from which the stereoscopic images are taken, by a method of intersection and resection using the stereoscopic images, wherein the selection of the camera positions is performed multiple times in such a manner that at least one different camera position is selected each time, the random dot pattern is formed on a surface of a longitudinal member that stands upward and is fixed on a table on which the measurement target object is placed, and the longitudinal member has a height greater than a height of the measurement target object placed on the table.

8. The three-dimensional measurement device according to claim 1, wherein the selection of the camera positions comprises:
performing first selection of three or more camera positions surrounding the measurement target object; and performing second selection of three or more camera positions surrounding the measurement target object, and the calculation of the camera position comprises:
calculating the camera positions selected in the first selection; and calculating the camera positions selected in the second selection, by using the calculated camera positions, which are selected in the first selection, as initial values.

9. The three-dimensional measurement device according to claim 2, wherein the selection of the camera positions comprises:

performing first selection of selecting N number of camera positions at angular positions mutually separated by 360 degrees/N, N being a natural number of 3 or greater, as viewed from the measurement target object; and performing second selection of selecting N number of camera positions at angular positions that are moved by 180 degrees/N, from the N number of the camera positions selected in the first selection, as viewed from the measurement target object.

10. The three-dimensional measurement device according to claim 2, wherein the selection of the camera positions comprises:
performing first selection of three or more camera positions surrounding the measurement target object; and performing second selection of three or more camera positions surrounding the measurement target object, and the calculation of the camera position comprises:
calculating the camera positions selected in the first selection; and calculating the camera positions selected in the second selection, by using the calculated camera positions, which are selected in the first selection, as initial values.

* * * * *